(12) United States Patent
Huang et al.

(10) Patent No.: US 12,487,754 B2
(45) Date of Patent: Dec. 2, 2025

(54) HEALTH MONITORING OF A MEMORY DEVICE USING IN-NAND PROCESSING

(71) Applicant: SK hynix Inc., Icheon-si (KR)

(72) Inventors: Pengfei Huang, San Jose, CA (US); Fan Zhang, Fremont, CA (US)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/410,851

(22) Filed: Jan. 11, 2024

(65) Prior Publication Data

US 2025/0231692 A1 Jul. 17, 2025

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
USPC ....................................................... 711/103
See application file for complete search history.

(56) References Cited

U.S. PATENT DOCUMENTS

| | | | |
|---|---|---|---|
| 10,700,706 B2 | 6/2020 | Zhang et al. | |
| 10,770,168 B2 | 9/2020 | Cadloni et al. | |
| 2020/0117557 A1* | 4/2020 | Singidi | G06F 11/3447 |
| 2021/0083694 A1* | 3/2021 | Zhang | H03M 13/1575 |
| 2022/0190845 A1* | 6/2022 | Asadi | H03M 13/1108 |
| 2022/0206894 A1* | 6/2022 | Li | G06F 12/0253 |

* cited by examiner

*Primary Examiner* — Hua J Song
(74) *Attorney, Agent, or Firm* — Perkins Coie LLP

(57) ABSTRACT

Devices, systems, and methods for improving performance of a non-volatile memory are described. An example method includes receiving, by the circuitry, a read command from a firmware. Herein, the firmware is configured to perform a media scan of the memory block, and the media scan comprises the read command. The method further includes the circuitry, in response to the read command, receiving raw data from the memory block, computing a metric associated with an accuracy of the raw data, and transmitting only the metric to the firmware. In this example, the circuitry comprises a checksum computation logic or an error correction code decoder, and the metric is a checksum or a failed bit count, respectively.

20 Claims, 8 Drawing Sheets

HEALTH MONITORING OF A MEMORY DEVICE USING IN-NAND PROCESSING

TECHNICAL FIELD

This patent document generally relates to non-volatile memory devices, and more specifically, to monitoring the health of non-volatile memory devices.

BACKGROUND

Memory management is a core function of a memory device. In an example, memory management includes allocating, organizing, and overseeing physical memory resources and virtual memory resources. Effective memory management enables multiple programs and processes to share limited memory resources for an optimized and responsive user computing experience. Memory management techniques include bad block management, block replacement, and the error correction code (ECC) software necessary to effectively increase the longevity of the memory device.

SUMMARY

Embodiments of the disclosed technology relate to methods, systems, and devices that improve performance of a block of a memory device. In an example, the performance of the memory device is improved by monitoring the health of the memory device using in-NAND computational capabilities. The proposed architecture eliminates a large amount of data transfers between the NAND and memory controller, thereby significantly reducing the power consumed and increasing the longevity of the memory device.

In one example, a method for improving performance of a NAND die comprising a circuitry and a memory block is described. The method includes receiving, by the circuitry, a read command from a firmware. Herein, the firmware is configured to perform a media scan of the memory block, and the media scan comprises the read command. The method further includes the circuitry, in response to the read command, receiving raw data from the memory block, computing a metric associated with an accuracy of the raw data, and transmitting only the metric to the firmware. In this example, the circuitry comprises a checksum computation logic or an error correction code (ECC) decoder, and the metric is a checksum or a failed bit count (FBC), respectively.

In another example, the methods may be embodied in the form of an apparatus that includes a processor and a memory coupled to the processor.

In yet another example, the methods may be embodied in the form of processor-executable instructions and stored on a computer-readable program medium.

The subject matter described in this patent document can be implemented in specific ways that provide one or more of the following features.

DETAILED DESCRIPTION

Semiconductor memory devices may be volatile or non-volatile. The volatile semiconductor memory devices perform read and write operations at high speeds, while contents stored therein may be lost at power-off. The nonvolatile semiconductor memory devices may retain contents stored therein even at power-off. The nonvolatile semiconductor memory devices may be used to store contents, which must be retained regardless of whether they are powered.

With an increase in a need for a large-capacity memory device, a multi-level cell (MLC) or multi-bit memory device storing multi-bit data per cell is becoming more common. However, memory cells in an MLC non-volatile memory device must have threshold voltages corresponding to four or more discriminable data states in a limited voltage window. For improvement of data integrity in non-volatile memory devices, the levels, and distributions of read voltages for discriminating the data states must be adjusted over the lifetime of the memory device to have optimal values during read operations and/or read attempts.

FIGS. 1-6 overview a non-volatile memory system (e.g., a flash-based memory, NAND flash) in which embodiments of the disclosed technology may be implemented.

Figure 1:
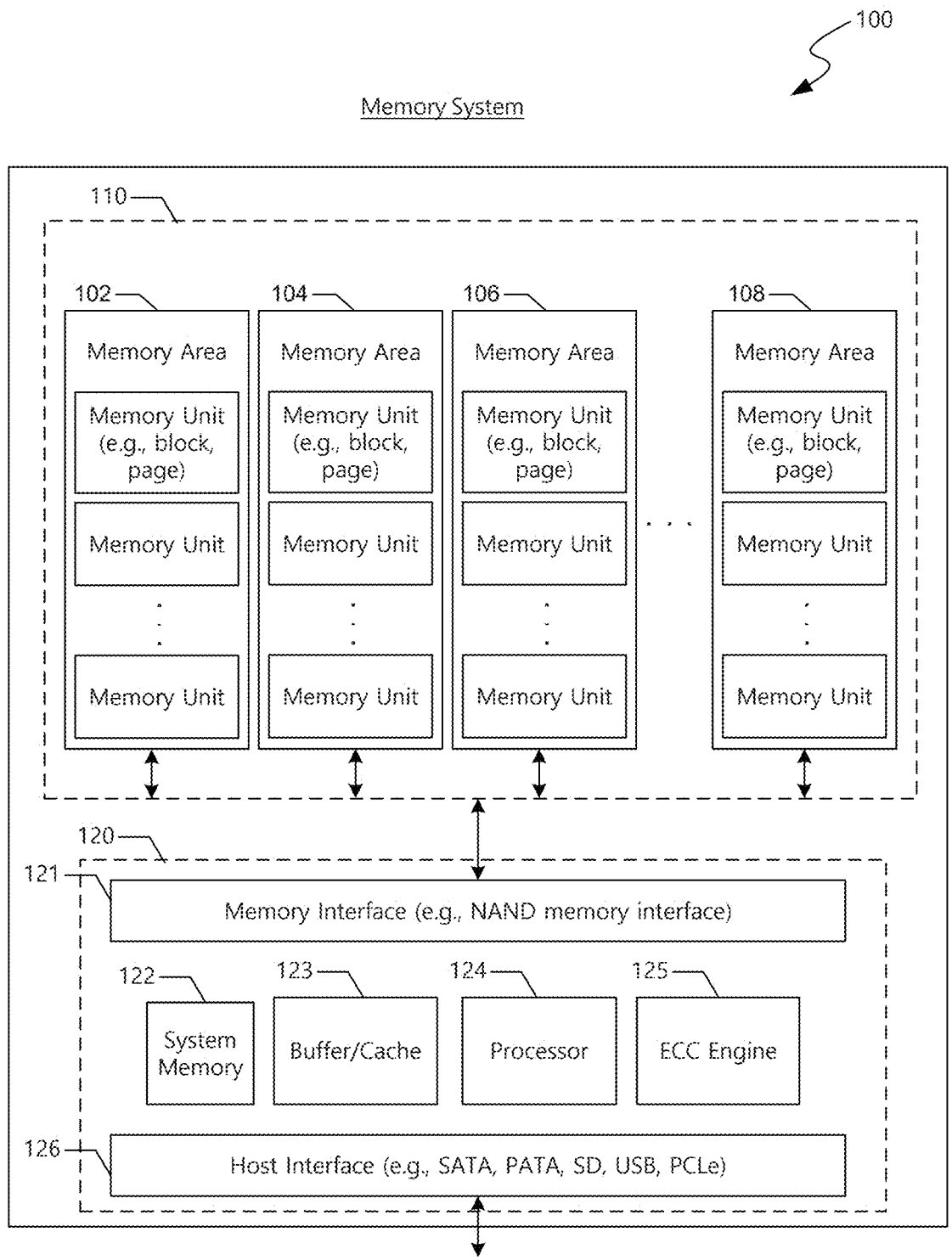
FIG. 1 illustrates an example of a memory system.

FIG. 1 is a block diagram of an example of a memory system 100 implemented based on some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, and 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a block or a page that can be identified by a unique address such as a block address or a page address, respectively. For another example, wherein the memory areas 102, 104, 106, and 108 can include computer memories that include memory banks as a logical unit of data storage, the memory unit can be a bank that can be identified by a bank address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change random-access memory (PRAM) cells, magnetoresistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 102, 104, 106, and 108 can be configured to store at least one bit of information (e.g., one bit of information or multiple bits of information), and each of the memory cells in memory area 102, 104, 106, and 108 can be configured to store more than one bit of information.

As shown in FIG. 1, the memory system 100 includes a controller module 120. The controller module 120 includes a memory interface 121 to communicate with the memory module 110, a host interface 126 to communicate with a host (not shown), a processor 124 to execute firmware-level code, and caches and memories 123 and 122, respectively to temporarily or persistently store executable firmware/instructions and associated information. In some implementations, the controller unit 120 can include an error correction engine 125 to perform error correction operation on information stored in the memory module 110. Error correction engine 125 can be configured to detect/correct single bit error or multiple bit errors. In another implementation, error correction engine 125 can be located in the memory module 110.

The host can be a device or a system that includes one or more processors that operate to retrieve data from the memory system 100 or store or write data into the memory system 100. In some implementations, examples of the host can include a personal computer (PC), a portable digital device, a digital camera, a digital multimedia player, a television, and a wireless communication device.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

Figure 2:
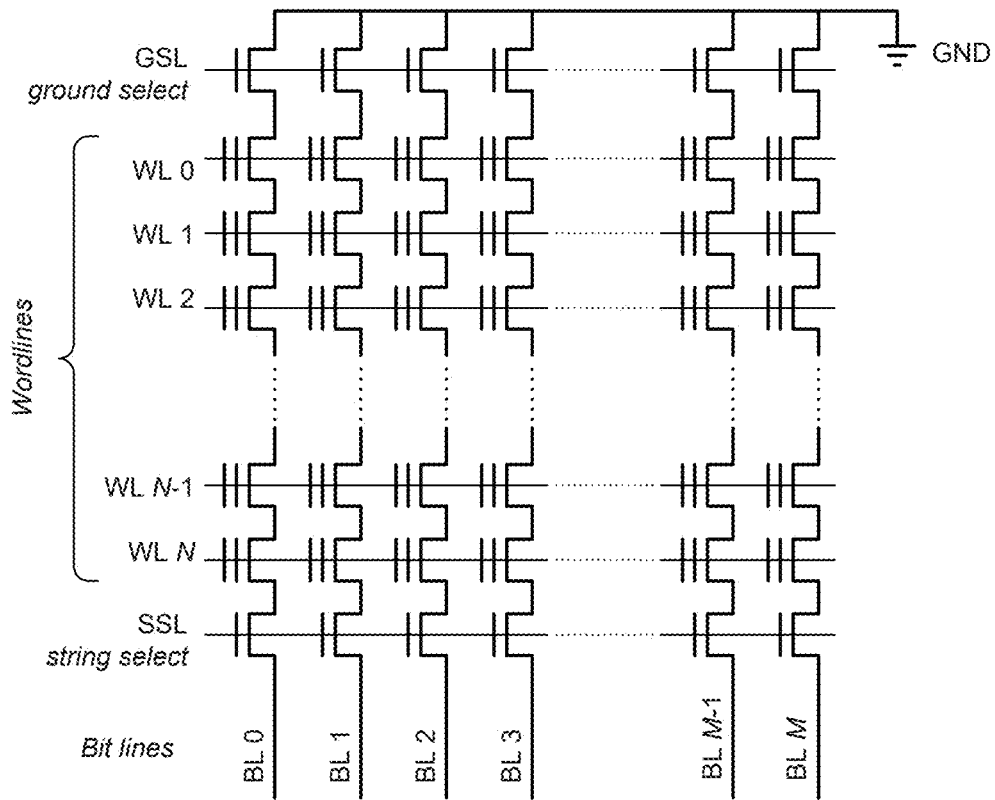
FIG. 2 is an illustration of an example non-volatile memory device.

FIG. 2 illustrates an example of a memory cell array implemented based on some embodiments of the disclosed technology.

In some implementations, the memory cell array can include NAND flash memory array that is partitioned into many blocks, and each block contains a certain number of pages. Each block includes a plurality of memory cell strings, and each memory cell string includes a plurality of memory cells.

In some implementations where the memory cell array is NAND flash memory array, read and write (program) operations are performed on a page basis, and erase operations are performed on a block basis. All the memory cells within the same block must be erased at the same time before performing a program operation on any page included in the block. In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

Figure 3:
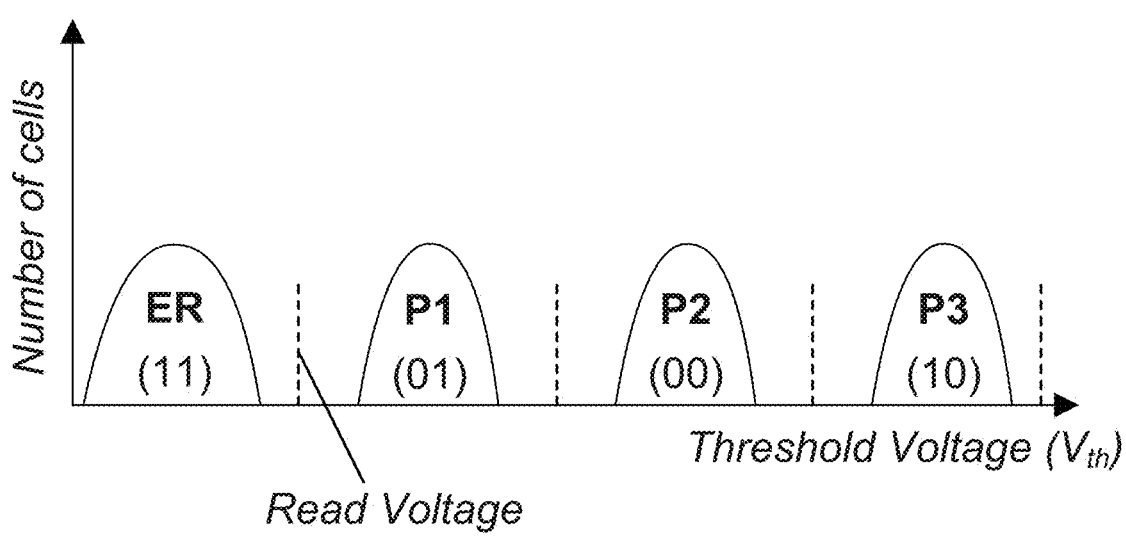
FIG. 3 is an example diagram illustrating the cell voltage level distribution (Vth) of a non-volatile memory device.

FIG. 3 illustrates an example of threshold voltage distribution curves in a multi-level cell device, wherein the number of cells for each program/erase state is plotted as a function of the threshold voltage. As illustrated therein, the threshold voltage distribution curves include the erase state (denoted "ER" and corresponding to "11") with the lowest threshold voltage, and three program states (denoted "P1", "P2" and "P3" corresponding to "01", "00" and "10", respectively) with read voltages in between the states (denoted by the dotted lines). In some embodiments, each of the threshold voltage distributions of program/erase states has a finite width because of differences in material properties across the memory array.

Although FIG. 3 shows a multi-level cell device by way of example, each of the memory cells can be configured to store any number of bits per cell. In some implementations, each of the memory cells can be configured as a single-level cell (SLC) to store one bit of information per cell, or as a triple-level cell (TLC) to store three bits of information per cell, or as a quad-level cells (QLC) to store four bits of information per cell.

In writing more than one data bit in a memory cell, fine placement of the threshold voltage levels of memory cells is needed because of the reduced distance between adjacent distributions. This is achieved by using incremental step pulse program (ISPP), i.e., memory cells on the same word-line are repeatedly programmed using a program-and-verify approach with a staircase program voltage applied to word-lines. Each programmed state associates with a verify voltage that is used in verify operations and sets the target position of each threshold voltage distribution window.

Read errors can be caused by distorted or overlapped threshold voltage distribution. An ideal memory cell threshold voltage distribution can be significantly distorted or overlapped due to, e.g., program and erase (P/E) cycle, cell-to-cell interference, and data retention errors, which will be discussed in the following, and such read errors may be managed in most situations by using error correction codes (ECCO).

Figure 4:
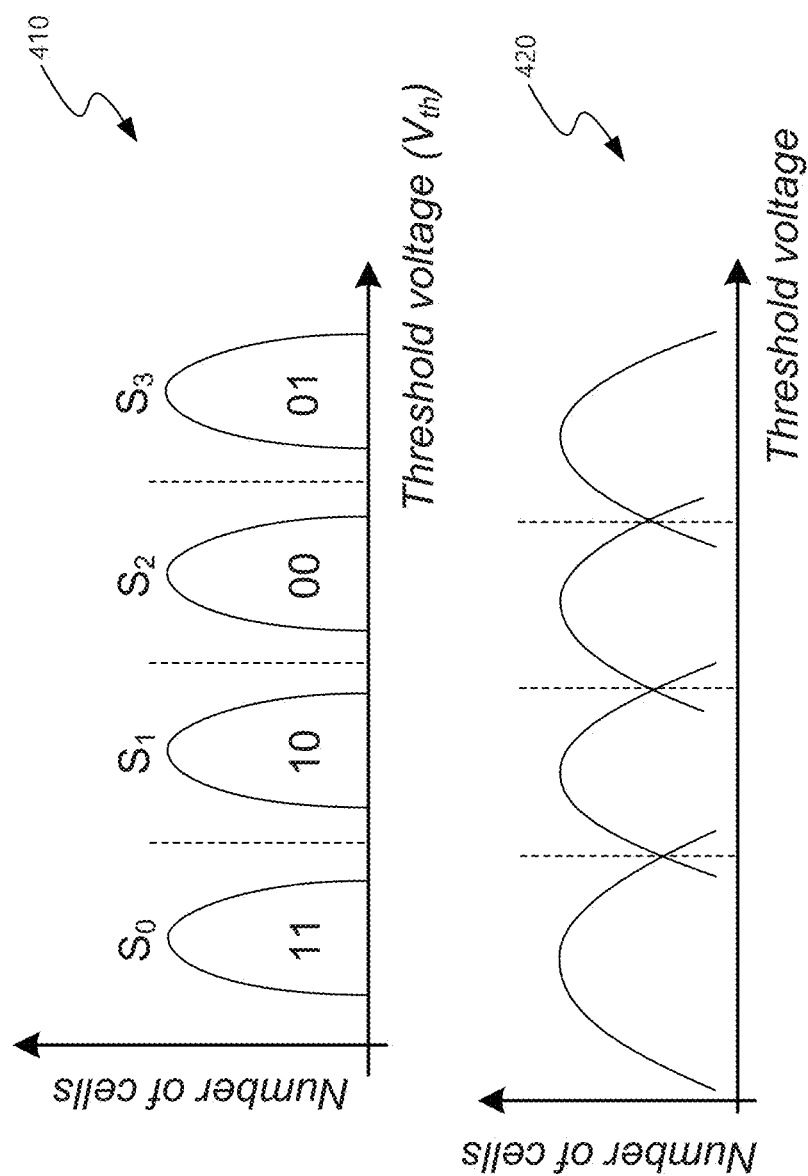
FIG. 4 is another example diagram illustrating the cell voltage level distribution (Vth) of a non-volatile memory device.

FIG. 4 illustrates an example of ideal threshold voltage distribution curves 410 and an example of distorted threshold voltage distribution curves 420. The vertical axis indicates the number of memory cells that has a particular threshold voltage represented on the horizontal axis.

For n-bit multi-level cell NAND flash memory, the threshold voltage of each cell can be programmed to $2^n$ possible values. In an ideal multi-level cell NAND flash memory, each value corresponds to a non-overlapping threshold voltage window.

Flash memory P/E cycling causes damage to a tunnel oxide of floating gate of a charge trapping layer of cell transistors, which results in threshold voltage shift and thus gradually degrades memory device noise margin. As P/E cycles increase, the margin between neighboring distributions of different programmed states decreases and eventually the distributions start overlapping. The data bit stored in a memory cell with a threshold voltage programmed in the overlapping range of the neighboring distributions may be misjudged as a value other than the original targeted value.

Figure 5:
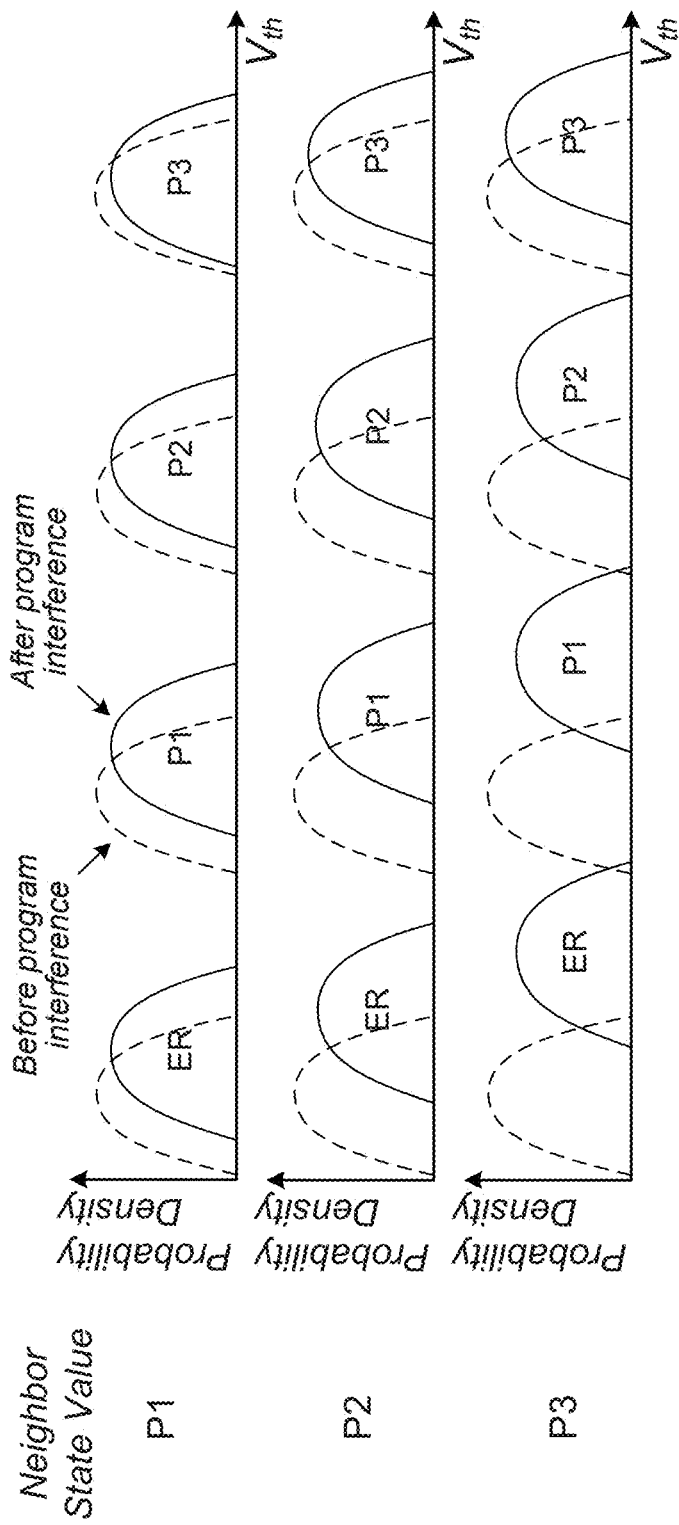
FIG. 5 is an example diagram illustrating the cell voltage level distribution (Vth) of a non-volatile memory device before and after program interference.

FIG. 5 illustrates an example of a cell-to-cell interference in NAND flash memory. The cell-to-cell interference can also cause threshold voltages of flash cells to be distorted. The threshold voltage shift of one memory cell transistor can influence the threshold voltage of its adjacent memory cell transistor through parasitic capacitance-coupling effect between the interfering cell and the victim cell. The amount of the cell-to-cell interference may be affected by NAND flash memory bit-line structure. In the even/odd bit-line structure, memory cells on one word-line are alternatively connected to even and odd bit-lines and even cells are programmed ahead of odd cells in the same word-line. Therefore, even cells and odd cells experience different amount of cell-to-cell interference. Cells in all-bit-line structure suffer less cell-to-cell interference than even cells in the even/odd bit-line structure, and the all-bit-line structure can effectively support high-speed current sensing to improve the memory read and verify speed.

The dotted lines in FIG. 5 denote the nominal distributions of P/E states (before program interference) of the cells under consideration, and the "neighbor state value" denotes the value that the neighboring state has been programmed to. As illustrated in FIG. 5, if the neighboring state is programmed to P1, the threshold voltage distributions of the cells under consideration shift by a specific amount. However, if the neighboring state is programmed to P2, which has a higher threshold voltage than P1, that results in a greater shift compared to the neighboring state being P1. Similarly, the shift in the threshold voltage distributions is greatest when the neighboring state is programmed to P3.

Figure 6:
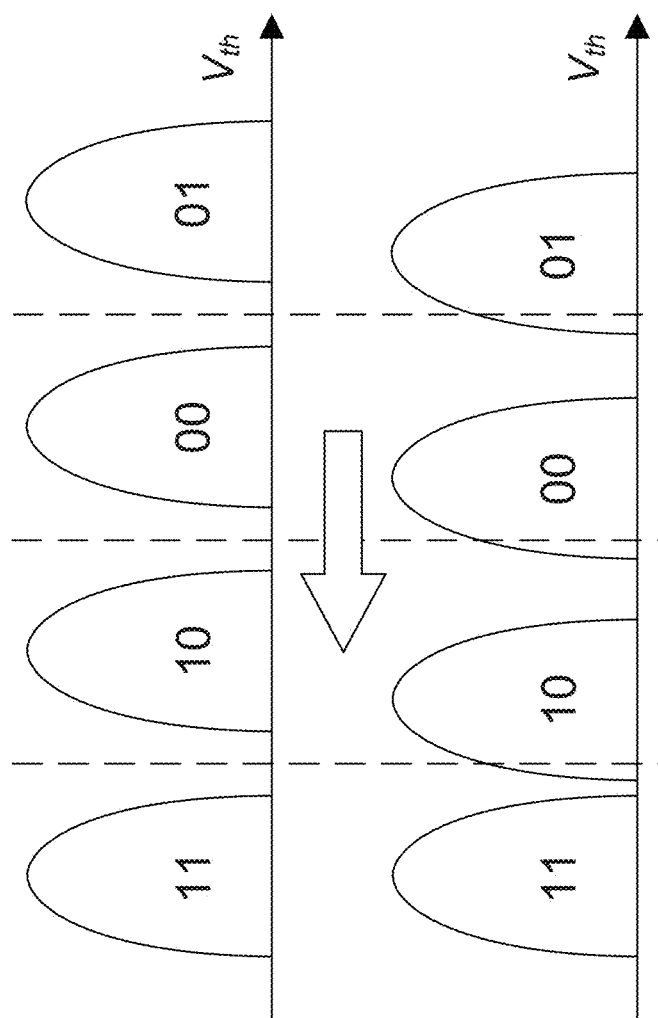
FIG. 6 is an example diagram illustrating the cell voltage level distribution (Vth) of a non-volatile memory device as a function of the reference voltage.

FIG. 6 illustrates an example of a retention error in NAND flash memory by comparing normal threshold-voltage distribution and shifted threshold-voltage distribution. The data stored in NAND flash memories tend to get corrupted over time and this is known as a data retention error. Retention errors are caused by loss of charge stored in the floating gate or charge trap layer of the cell transistor. Due to wear of the floating gate or charge trap layer, memory cells with more program erase cycles are more likely to experience retention errors. In the example of FIG. 6, comparing the top row of voltage distributions (before corruption) and the bottom row of distributions (contaminated by retention error) reveals a shift to the left.

NAND-based storage systems (e.g., the examples illustrated in FIGS. 1-6), and solid-state drive (SSD) applications, require high reliability, high performance (e.g., throughput and quality-of-service (QOS)), and high power efficiency. To achieve high reliability, the SSD controller (e.g., the firmware (FW) or system-on-chip (SoC)) monitors NAND media health by checking the data stored in NAND periodically, e.g., using an error correction code (ECC) to check read back data validity. In an example, a low-density parity-check (LDPC) code can be used as the ECC. If the failed bit count (FBC) of the data read back exceeds a certain threshold, the SSD controller is configured to copy the data from the checked blocks to other fresh blocks, and recycle the checked blocks. However, there are several issues with the current media health monitoring solutions. First, current systems require transferring media scan and audit raw data from the NAND to the SSD controller, which consumes a significant amount of bus bandwidth and may cause collisions with host traffic, resulting in performance degradation. In addition, the data movement between the NAND and SSD controller consumes a significant amount of power. This is particularly problematic to enterprise SSD applications because performance and power are essential to those applications.

Figure 7:
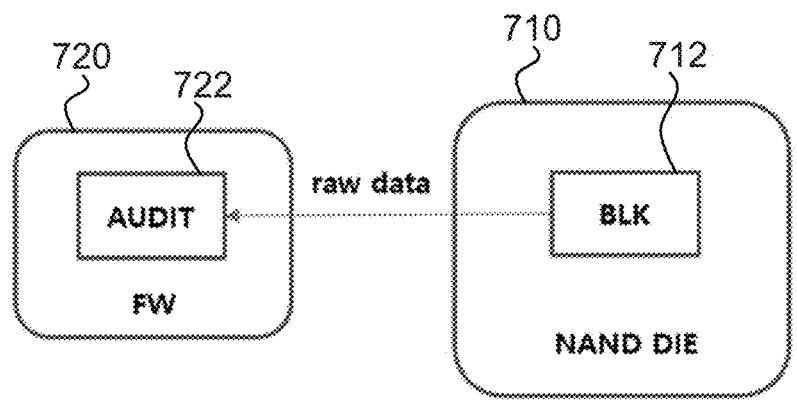
FIG. 7 is a block diagram of an existing NAND health monitoring architecture.
Figure 8:
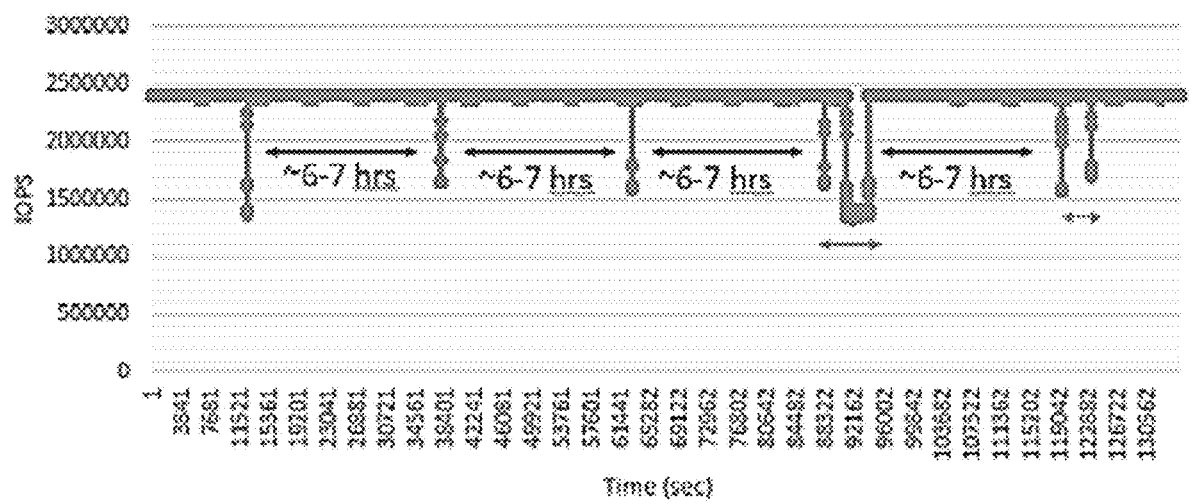
FIG. 8 is a plot illustrating the number of input/output operations of an example NAND storage device as a function of time.

An example of the current architecture for NAND media health monitoring is shown in FIG. 7. As shown therein, the SSD controller 720 includes media scan and audit functionality 722 that uses test reads to read back raw data (e.g., noisy codewords) from a block 712 in the NAND (or NAND die) 710. After LDPC decoding, the SSD controller obtains a failed bit count (FBC) of the raw data. If the FBC exceeds a predetermined threshold, which means the media from which this data was read is noisy enough, the controller will copy the data to fresh blocks and recycle the block. Furthermore, to combat power-on data retention, the current firmware scans all the blocks periodically, e.g., every 15 days. For monitoring read disturb, when single page random reads reach one million, the current firmware starts an audit procedure. In existing drive tests, a performance drop was observed during audit, as shown in FIG. 8.

Embodiments of the disclosed technology provide methods and architectures for monitoring media health with in-NAND computational capabilities, i.e., computations performed inside of the NAND. This architecture eliminates a large amount of data transfers between the NAND and SSD controller, which advantageously results in greatly improved SSD performance and significant power savings.

Figure 9A:
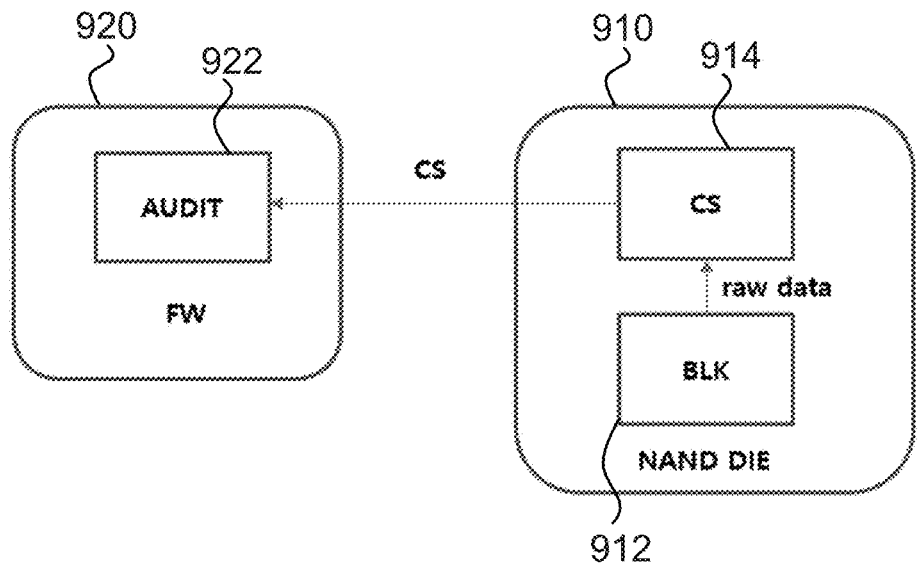
FIGS. 9A and 9B are block diagrams of example architectures for NAND health monitoring, in accordance with embodiments of the disclosed technology.
Figure 9B:
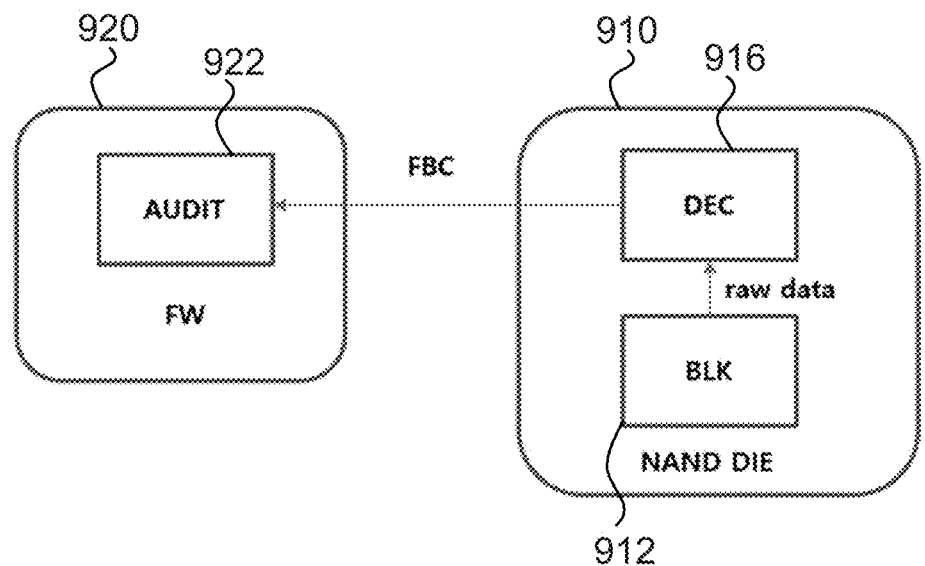

FIGS. 9A and 9B are block diagrams of example architectures for NAND health monitoring, in accordance with embodiments of the disclosed technology. As shown in FIG. 9A, a checksum (CS) computation logic 914 is added to the NAND die 910 that includes the memory block 912 that is being audited by the audit functionality 922 in the firmware 920. Here, an input to the CS computation logic 914 is a noisy LDPC codeword, and the output is the checksum thereof. For an LDPC code with an m×n parity-check matrix H, the CS computation of a length-n noisy codeword R is given as:

$$s = RH^T.$$

Herein, s is the syndrome and the checksum (CS) is the number of 1's (or one-valued entries) in the vector syndrome. For media scans and audit tasks, the raw data (e.g., the noisy codeword) from memory block 912 will go to the CS computation logic 914 to generate the checksum, and then the NAND die 910 only transfers the computed checksum to the firmware 920, instead of transferring the raw data (e.g., the noisy codeword) thereto.

In some embodiments, the firmware media scan/audit procedure for the architecture shown in FIG. 9A includes the following operations:

Step 1. During a media scan/audit, the firmware 920 sends a test read command to the NAND die 910;

Step 2. The NAND die 910 receives the test read command, reads raw data (e.g., the noisy codeword) from a memory block 912, and inputs the raw data to the CS computation logic 914;

Step 3. The CS computation logic 914 computes the checksum of the raw data;

Step 4. The NAND die 910 only transfers the calculated checksum to the firmware 920 (instead of the raw data, e.g., the noisy codeword); and Step 5. The firmware 920 receives the calculated checksum. If the checksum is above a predetermined threshold a, the firmware 920 will copy the data out of the memory block 912 and into fresh blocks (not shown in FIG. 9A); otherwise, no action is taken.

In the architecture shown in FIG. 9B, a light-weight decoder 916 is added to the NAND die 910, and is configured to receive a noisy codeword from the memory block 912. The decoder 916 computes the failed bit count (FBC) of the input noisy codeword, which represents the number of flipped bits in the noisy codeword from the decoded codeword. For media scans and audit tasks, the raw data (e.g., the noisy codeword) from memory block 912 will go to the light-weight decoder 916 to generate the FBC, and then the NAND die 910 only transfers the FBC result to the firmware 920, instead of transferring the raw data (e.g., the noisy codeword) thereto. In some embodiments, the firmware media scan/audit procedure for the architecture shown in FIG. 9B includes the following operations:

Step 1. During a media scan/audit, the firmware 920 sends a test read command to the NAND die 910;

Step 2. The NAND die 910 receives the test read command, reads raw data (e.g., the noisy codeword) from a memory block 912, and inputs the raw data to the in-NAND light-weight decoder 916;

Step 3. The light-weight decoder 916 decodes the raw data and calculates the corresponding FBC for that codeword;

Step 4. The NAND die 910 only transfers the FBC to the firmware 920 (instead of the raw data, e.g., the noisy codeword); and Step 5. The firmware 920 receives the FBC. If the FBC is above a predetermined threshold a, the firmware 920 will copy the data out of the memory block 912 and into fresh blocks (not shown in FIG. 9A); otherwise, no action is taken.

Both the architectures illustrated in FIGS. 9A and 9B avoid directly transferring any raw data from the NAND (or NAND die) 910 to the SSD controller (or firmware) 920, which advantageously improves performance and reduces power consumption.

In some embodiments, and for both the architectures shown in FIGS. 9A and 9B, the threshold can be predetermined using empirical test data for the same type of NAND die, with different criteria being used for different implementations. In an example, the FBC threshold is selected based on the hard decoding capability of the LDPC code. In another example, and based on multiple CS values (i.e., a CS distribution) being associated with a certain FBC value, the CS threshold is selected as the median (or mean) value of the CS distribution. Alternatively, and depending on the implementation, a minimum value or a maximum value of the CS distribution could be used for the CS threshold.

Figure 10:
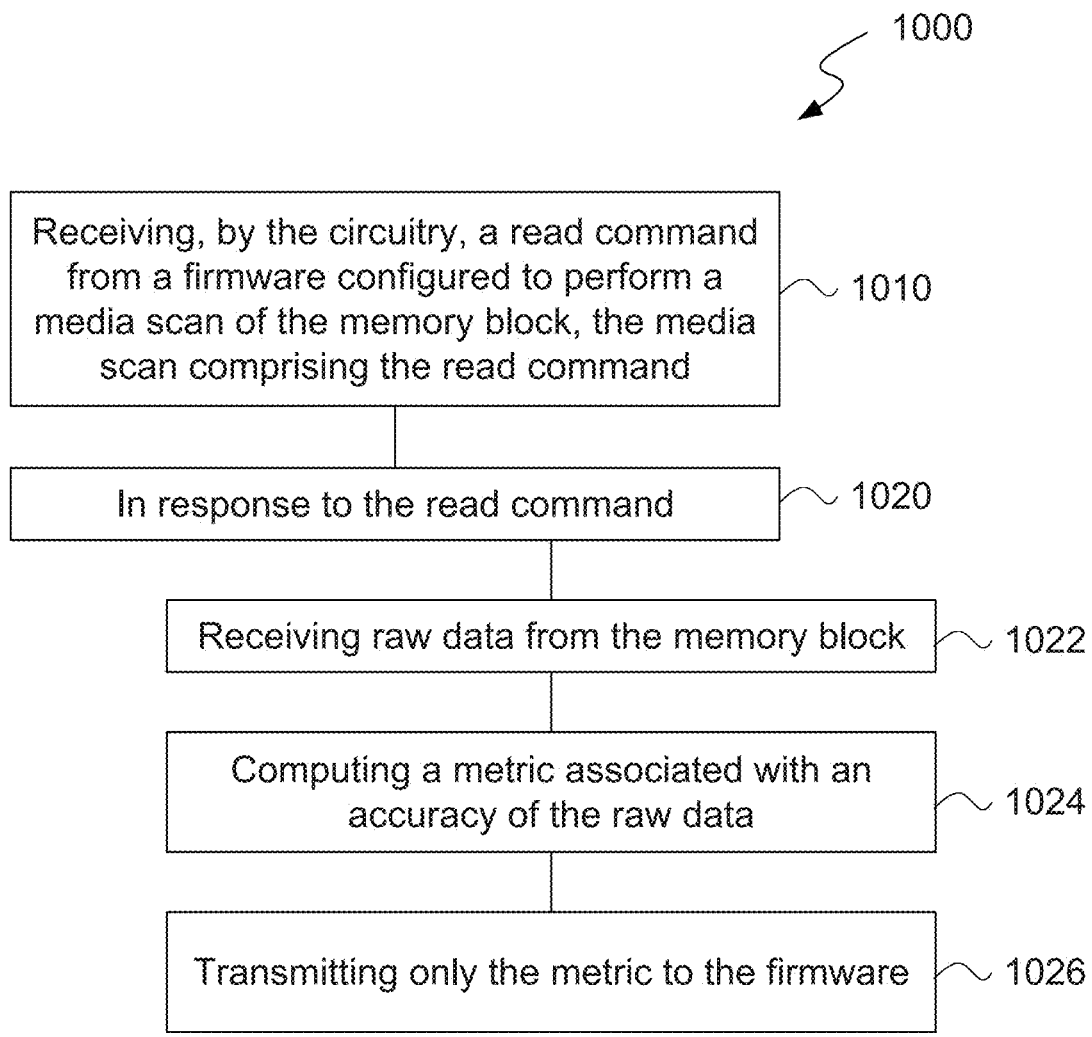
FIG. 10 illustrates a flowchart of an example method for improving performance of a memory device.

FIG. 10 illustrates a flowchart of an example method 1000 for improving performance of a NAND die comprising a circuitry and a memory block. The method 1000 includes, at operation 1010, receiving, by the circuitry, a read command from a firmware configured to perform a media scan of the memory block, the media scan comprising the read command.

The method 1000 includes, at operation 1020, performing operations 1022 through 1026 in response to the read command. Herein, operation 1022 includes receiving raw data from the memory block, operation 1024 includes computing a metric associated with an accuracy of the raw data, and operation 1026 includes transmitting only the metric to the firmware. In this example, the circuitry comprises a checksum computation logic or an error correction code (ECC) decoder, and the metric is a checksum or a failed bit count (FBC), respectively.

In some embodiments, the firmware is configured to copy, upon determining that the metric is greater than a threshold, the raw data from the memory block to a different memory block. As described in the context of FIGS. 9A and 9B, the metric (either the checksum or the FBC) exceeding the threshold is indicative of the memory block being too noisy to reliably store data, and thus the data thereon is moved to a different (or fresh) memory block, and the memory block is recycled.

In some embodiments, the threshold is determined based on empirical testing data for a type of the NAND die In an example, for a TLC NAND, the FBC threshold is set to 240 and the CS threshold is set to 819. In another example, for a QLC NAND, the FBC threshold is set to 350 and the CS threshold is set to 1149.

In some embodiments, the raw data comprises a noisy codeword that is based on a transmitted codeword generated from a low-density parity-check (LDPC) code.

In some embodiments, and as described in the context of FIG. 9A, an output of the checksum computation logic is the checksum of the noisy codeword. In an example, the checksum is a number of one-valued entries of a syndrome, and the syndrome is determined based on a product of the noisy codeword and a transpose of a parity check matrix of the LDPC code.

In some embodiments, and as described in the context of FIG. 9B, the ECC decoder is configured to decode the noisy codeword to generate a candidate version of the transmitted codeword, and an output of the ECC decoder is the FBC corresponding to a number of bit errors in the candidate version of the transmitted codeword.

In some embodiments, the method 1000 further includes the operation of refraining from transmitting the raw data to the firmware. As previously described, this advantageously improves the power efficiency of the NAND die.

In some embodiments, the read command is part of an audit functionality of the firmware.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for improving performance of a NAND die comprising a circuitry and a memory block, comprising:
   receiving, by the circuitry on the NAND die, a read command from a firmware, wherein the firmware is configured to perform a media scan of the memory block on the NAND die, and wherein the media scan comprises the read command; and
   performing, by the circuitry, in response to the read command, operations including:
   receiving raw data from the memory block,
   computing a metric associated with an accuracy of the raw data, and
   transmitting only the metric to the firmware,
   wherein the circuitry comprises a checksum computation logic or an error correction code (ECC) decoder, and wherein the metric is a checksum or a failed bit count (FBC), respectively.

2. The method of claim 1, wherein the firmware is configured to copy, upon determining that the metric is greater than a threshold, the raw data from the memory block to a different memory block.

3. The method of claim 1, wherein the raw data comprises a noisy codeword that is based on a transmitted codeword generated from a low-density parity-check (LDPC) code.

4. The method of claim 3, wherein an output of the checksum computation logic is the checksum of the noisy codeword.

5. The method of claim 4, wherein the checksum is a number of one-valued entries of a syndrome, and wherein the syndrome is determined based on a product of the noisy codeword and a transpose of a parity check matrix of the LDPC code.

6. The method of claim 3, wherein the ECC decoder is configured to decode the noisy codeword to generate a candidate version of the transmitted codeword, and wherein an output of the ECC decoder is the FBC corresponding to a number of bit errors in the candidate version of the transmitted codeword.

7. The method of claim 1, comprising:
   refraining from transmitting the raw data to the firmware.

8. The method of claim 1, wherein the read command is part of an audit functionality of the firmware.

9. A system for improving performance of a NAND die comprising a circuitry and a memory block, comprising:
a processor and a memory including instructions stored thereupon, wherein the instructions upon execution by the processor cause the processor to:
receive, by the circuitry on the NAND die, a read command from a firmware, wherein the firmware is configured to perform a media scan of the memory block on the NAND die, and wherein the media scan comprises the read command; and
perform, by the circuitry, in response to the read command, operations including:
receiving raw data from the memory block,
computing a metric associated with an accuracy of the raw data, and
transmitting only the metric to the firmware,
wherein the circuitry comprises a checksum computation logic or an error correction code (ECC) decoder, and wherein the metric is a checksum or a failed bit count (FBC), respectively.

10. The system of claim 9, wherein the firmware is configured to copy, upon determining that the metric is greater than a threshold, the raw data from the memory block to a different memory block, and wherein the threshold is determined based on empirical testing data for a type of the NAND die.

11. The system of claim 9, the raw data comprises a noisy codeword that is based on a transmitted codeword generated from a low-density parity-check (LDPC) code.

12. The system of claim 11, wherein an output of the checksum computation logic is the checksum of the noisy codeword.

13. The system of claim 12, wherein the checksum is a number of one-valued entries of a syndrome, and wherein the syndrome is determined based on a product of the noisy codeword and a transpose of a parity check matrix of the LDPC code.

14. The system of claim 11, wherein the ECC decoder is configured to decode the noisy codeword to generate a candidate version of the transmitted codeword, and wherein an output of the ECC decoder is the FBC corresponding to a number of bit errors in the candidate version of the transmitted codeword.

15. A non-transitory computer-readable storage medium having instructions stored thereupon for improving performance of a NAND die comprising a circuitry and a memory block, comprising:
instructions for receiving, by the circuitry on the NAND die, a read command from a firmware, wherein the firmware is configured to perform a media scan of the memory block on the NAND die, and wherein the media scan comprises the read command; and
instructions for performing, by the circuitry, in response to the read command, operations including:
receiving raw data from the memory block,
computing a metric associated with an accuracy of the raw data, and
transmitting only the metric to the firmware,
wherein the circuitry comprises a checksum computation logic or an error correction code (ECC) decoder, and wherein the metric is a checksum or a failed bit count (FBC), respectively.

16. The non-transitory computer-readable storage medium of claim 15, wherein the firmware is configured to copy, upon determining that the metric is greater than a threshold, the raw data from the memory block to a different memory block, and wherein the threshold is determined based on empirical testing data for a type of the NAND die.

17. The non-transitory computer-readable storage medium of claim 15, wherein the raw data comprises a noisy codeword that is based on a transmitted codeword generated from a low-density parity-check (LDPC) code.

18. The non-transitory computer-readable storage medium of claim 17, an output of the checksum computation logic is the checksum of the noisy codeword.

19. The non-transitory computer-readable storage medium of claim 18, wherein the checksum is a number of one-valued entries of a syndrome, and wherein the syndrome is determined based on a product of the noisy codeword and a transpose of a parity check matrix of the LDPC code.

20. The non-transitory computer-readable storage medium of claim 17, wherein the ECC decoder is configured to decode the noisy codeword to generate a candidate version of the transmitted codeword, and wherein an output of the ECC decoder is the FBC corresponding to a number of bit errors in the candidate version of the transmitted codeword.

* * * * *